United States Patent
Pinho et al.

(10) Patent No.: US 11,941,450 B2
(45) Date of Patent: Mar. 26, 2024

(54) AUTOMATIC PLACEMENT DECISIONS FOR RUNNING INCOMING WORKLOADS ON A DATACENTER INFRASTRUCTURE

(71) Applicant: Dell Products L.P., Round Rock, TX (US)

(72) Inventors: Rômulo Teixeira De Abreu Pinho, Niteroi (BR); Satyam Sheshansh, Bangalore (IN); Hung Dinh, Austin, TX (US); Bijan Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 534 days.

(21) Appl. No.: 17/241,684

(22) Filed: Apr. 27, 2021

(65) Prior Publication Data

US 2022/0342704 A1 Oct. 27, 2022

(51) Int. Cl.
*G06F 9/50* (2006.01)
*G06N 20/00* (2019.01)

(52) U.S. Cl.
CPC .............. *G06F 9/505* (2013.01); *G06N 20/00* (2019.01)

(58) Field of Classification Search
None
See application file for complete search history.

(56) References Cited

U.S. PATENT DOCUMENTS

| | | |
|---|---|---|
| 10,909,503 B1 | 2/2021 | Dias et al. |
| 2019/0317818 A1* | 10/2019 | Krishna Rao ........... H04L 67/10 |
| 2020/0057675 A1 | 2/2020 | Dias et al. |
| 2023/0067026 A1* | 3/2023 | Huts ...................... G06V 20/00 |

OTHER PUBLICATIONS

Kumar et al., "EWPTNN: An Efficient Workload Prediction Model in Cloud Computing Using Two-Stage Neural Networks;" International Conference on Recent Trends in Advanced Computing (ICRTAC 2019); Procedia Computer Science 165; Jan. 2019; pp. 151-157; 7 Pages.

* cited by examiner

*Primary Examiner* — Eric C Wai
(74) *Attorney, Agent, or Firm* — DALY, CROWLEY, MOFFORD & DURKEE, LLP

(57) ABSTRACT

A system and method place an incoming workload within a data center having infrastructure elements (IEs) for execution. Instrumentation data are collected for both individual IEs in the data center, and workload instances executing on each of these IEs. These data are used to train a future load model according to machine learning techniques, especially supervised learning. Future loads, in turn, are used to train a ranking model that ranks IEs according to suitability to execute additional workloads. After receiving an incoming workload, the first model is used to predict, for each IE, the load on its computing resources if the workload were executed on that IE. The resulting predicted loads are then fed into the second model to predict the best ranking of IEs, and the workload is placed on the highest-ranked IE that is available to execute the workload.

20 Claims, 4 Drawing Sheets

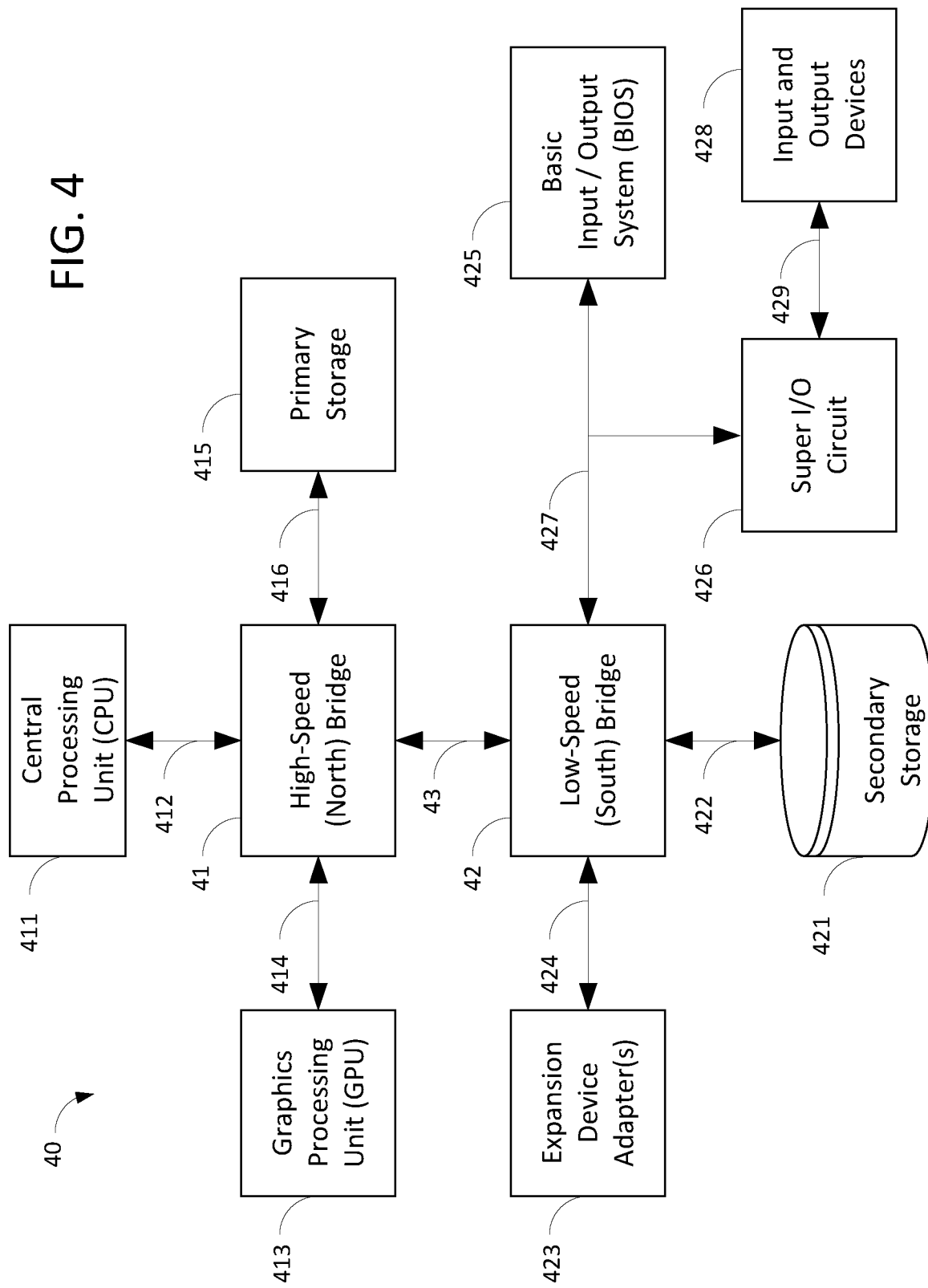

AUTOMATIC PLACEMENT DECISIONS FOR RUNNING INCOMING WORKLOADS ON A DATACENTER INFRASTRUCTURE

FIELD

This disclosure pertains generally to allocation of resources in a multiprogramming arrangement such as a data center, and more particularly to allocation of a machine in the data center to service an incoming workload considering the existing load.

BACKGROUND

Modern data centers typically host a multitude of applications for their large enterprise customers. These applications can vary from transactional systems that perform customer relationship management (CRM) or enterprise resource planning (ERP), act as message-oriented middleware (MoM), or provide online transactional processing (OLTP) for analytical processing in connection with business intelligence (BI) and "big data" applications. Complex, transactional applications like these often divide their operation into "workloads", each of which represents a single transaction or a portion of a computation.

For large organizations, a significant footprint of physical and virtual infrastructure exists in order to support shared execution environments. Various applications are hosted in these shared environments and different types of interactions can happen at the same time in these environments. Requests for a service or application programming interface (API), requests for a web interaction with a user, running a batch job or extract-transform-load (ETL) process, and a deployment or upgrade to an application can happen at the same time. All these types of loads and interactions can work independently fine, but with some combinations of processes, load, and condition of the execution run-time, the state and condition of the execution entity can potentially downgrade and cause performance issues, application behavior anomalies or more severe infrastructure outages.

Thus, execution environments are shared among a variety of applications that can affect the run-time differently. Resource utilization of these applications can vary drastically: some are CPU-intensive, while others are more memory- or input/output (I/O)-bound. A single application instance can be deployed on multiple infrastructure entities (i.e. servers, virtual machines, or execution containers) across the data center, while a single infrastructure entity can host multiple application instances or service components. This many-to-many relationship can lead to uneven application workload distribution across the infrastructure resources in a data center. Uneven workload distribution can cause severe performance and scalability issues in the application. These issues, in turn, can negatively impact user experience, prevent optimal use of resources, and add unnecessary operational expenditure to the enterprise.

Various approaches to avoid uneven workload distribution are known. Many existing commercial workload distribution approaches use standard load balancers to distribute incoming workloads to multiple execution endpoints. They can be as rudimentary as round robin, to mildly intelligent like dynamic weighted or fully dynamic with server response time. These approaches lack sophistication: their goal is simply to distribute the incoming traffic to all available execution entities, and they treat all types of workloads and all types of entities equally. In reality, different types of inbound application requests or services can incur different execution loads based on their functions. Some can be simple stateless transactions while others can be resource intensive, stateful, or batch-oriented applications that can take a heavy toll on the execution environment.

Some commercial solutions, such vRealize from VMWare, Inc. of Palo Alto, CA, and other work from academia, have explored methods for placing incoming workloads onto virtual machines (VMs) and/or execution containers across an infrastructure by considering only infrastructure configuration. While some of those methods can be quite sophisticated, they do not consider workload characteristics to guide their decisions. As a result, under-subscription or over-subscription of resources due to erroneous VM or container configuration might go undetected, leading to poor workload balancing. While this can be corrected via VM and container migration, such techniques can be costly and may impair the workloads themselves, eventually taking the risk of violating quality-of-service (QoS) guarantees.

Mechanisms have been proposed to predict quality-of-service metrics of running workloads for the purposes optimal resource allocation. Such work, however, was concerned with rebalancing an already running workload if, based on the QoS predictions, it would not satisfy (or would exceed) previously defined service-level agreements. This rebalancing focus is not appropriate to the problem of allocating resources to an incoming workload, such as the one resulting from a web request, that has not yet begun execution.

Some researchers have attempted to intelligently scale up data centers to accommodate additional workloads. One group used a two-stage model that first classified VMs based on utilization, then predicted load on over-utilized and under-utilized VMs to determine how best to scale up resources (i.e. VMs) within the infrastructure. However, upscaling data centers by indicating a best way to add resources to the infrastructure is not a solution to the problem of allocating existing resources to an incoming workload.

SUMMARY OF DISCLOSED EMBODIMENTS

Embodiments of the concepts, techniques, and structures disclosed herein balance and distribute incoming workloads across infrastructure entities (IEs) in a data center. Embodiments place incoming workloads onto IEs initially, and therefore are complementary to, techniques for balancing workloads already executing in the data center, or for scaling up the data center. Embodiments analyze the condition of the execution environments and their health metrics to intelligently balance workload execution across various resources in the data center. Leveraging multidimensional data sets gathered from the execution environment, and using statistical algorithms, embodiments allow a data center administration engine to automatically predict the future load of any data center infrastructure element, given an incoming workload to be executed and the current health of the IEs. Applying machine learning to the execution resource load aspects of each inbound request, embodiments use a load balancing algorithm to rank the IEs based on the predicted loads, and recommend the most appropriate execution runtime environment.

Embodiments perform the dynamic monitoring and tracking of resource parameters across the entire collection of infrastructure entities to balance the workloads and optimize the utilization of all infrastructure resources. The workload balancer tracks multidimensional data points including resource usage of central processing units (CPUs), input/output (I/O) devices, memory, process/thread utilization of each infrastructure entity, and the performance of application/services on that entity. These data are used to establish correlation and covariance among these parameters and train machine learning algorithms to detect, isolate, and/or diagnose problems and recommend the right execution entity for the right application/service. The result of these processes is to recommend the optimal infrastructure entity that can provide the best performance for the incoming service request and application usage.

Therefore, a first embodiment is a computerized system for starting execution of a given workload in a data center having a plurality of infrastructure elements. The computerized system has a data receiver for receiving, from a workload manager, data indicating the given workload. The computerized system also has a future load predictor, for each infrastructure element in the plurality of infrastructure elements, using a first model trained using machine learning to predict a load, during a future time window for each of a plurality of computing resources, that would occur if the given workload were executed using that infrastructure element. The computerized system further has a placement ranking predictor, using a second model trained using machine learning to predict, as a function of the predicted future loads, a ranking of infrastructure elements that would be most suited to execute the given workload. The computerized system additionally has an infrastructure element selector for selecting one or more infrastructure elements according to the ranking. And the computerized system has a data transmitter for transmitting, to the workload manager, data indicating the selected one or more infrastructure elements, wherein the workload manager responsively starts execution of the given workload on the indicated one or more infrastructure elements.

In some embodiments, either or both of the first model and the second model were trained, using supervised machine learning, on telemetry data collected from the plurality of infrastructure elements over a plurality of time windows.

In some embodiments, the computing resources include any combination of a required CPU time, a required memory space, and a required disk space.

In some embodiments, using the first model comprises providing, to the first model, inputs comprising statistical measures of computing resources used during a current time window by (a) other instances of the given workload currently executing in the data center, and (b) each infrastructure element in the plurality of infrastructure elements.

In some embodiments, the first model comprises, when no instances of the given workload are currently executing in the data center, predicting a future load for each of the plurality of computing resources that corresponds to a historical average load.

In some embodiments, selecting the infrastructure element according to the ranking comprises selecting a highest ranked infrastructure element that satisfies one or more workload acceptance criteria.

A second embodiment is a method of starting execution of a given workload in a data center having a plurality of infrastructure elements. The method first includes, for each infrastructure element in the plurality of infrastructure elements, using a first model trained using machine learning to predict a load, during a future time window for each of a plurality of computing resources, that would occur if the given workload were executed using that infrastructure element. The method next includes using a second model trained using machine learning to predict, as a function of the predicted future loads, a ranking of infrastructure elements that would be most suited to execute the given workload. The method continues with selecting one or more infrastructure elements according to the ranking. And the method completes with starting execution of the given workload on the selected one or more infrastructure elements.

In some embodiments, either or both of the first model and the second model were trained, using supervised machine learning, on telemetry data collected from the plurality of infrastructure elements over a plurality of time windows.

In some embodiments, the computing resources include any combination of a required CPU time, a required memory space, and a required disk space.

In some embodiments, using the first model comprises providing, to the first model, inputs comprising statistical measures of computing resources used during a current time window by (a) other instances of the given workload currently executing in the data center, and (b) each infrastructure element in the plurality of infrastructure elements.

In some embodiments, using the first model comprises, when no instances of the given workload are currently executing in the data center, predicting a future load for each of the plurality of computing resources that corresponds to a historical average load.

In some embodiments, selecting the infrastructure element according to the ranking comprises selecting a highest ranked infrastructure element that satisfies one or more workload acceptance criteria.

In some embodiments, starting execution of the given workload comprises starting a new service on a computer server, or starting a new process in an existing virtual machine, or starting execution of a containerized process.

A third embodiment is a non-transitory, computer-readable storage medium, in which is stored computer program code for performing the above method embodiment or any of its variants.

It is appreciated that the concepts, techniques, and structures described above may be embodied in other ways, and thus that the above summary of embodiments is not comprehensive but merely illustrative.

DESCRIPTION OF THE SEVERAL VIEWS OF THE DRAWINGS

The manner and process of making and using the disclosed embodiments may be appreciated by reference to the drawings, in which:

FIG. 4 schematically shows relevant physical components of a computer that may be used to embody, in whole or in part, the concepts, structures, and techniques disclosed herein.

DETAILED DESCRIPTION OF EMBODIMENTS

In this specification, including the appended claims, the following quoted terms shall have the indicated meanings that are not limited to specific embodiments, except where expressly indicated otherwise:

A "computing resource" is any capability of a computer system that is used to perform a computation. Computing resources include without limitation: time for accessing a central processing unit (CPU) or a data communication network, and space in a computer memory or on a data storage device.

"Resource utilization" or "load" is the fraction (or percentage) of the maximum capability of a given computing resource that is being used to perform one or more computations. As a fraction of a maximum capability, load is measured by numbers between 0.0 and 1.0, inclusive.

A "workload" is a computation that requires computing resources.

An "infrastructure element" (IE) is a machine that provides computing resources used during a current time window by workloads. Infrastructure entities include without limitation: computer servers, virtual machines, and container execution environments.

Figure 1:
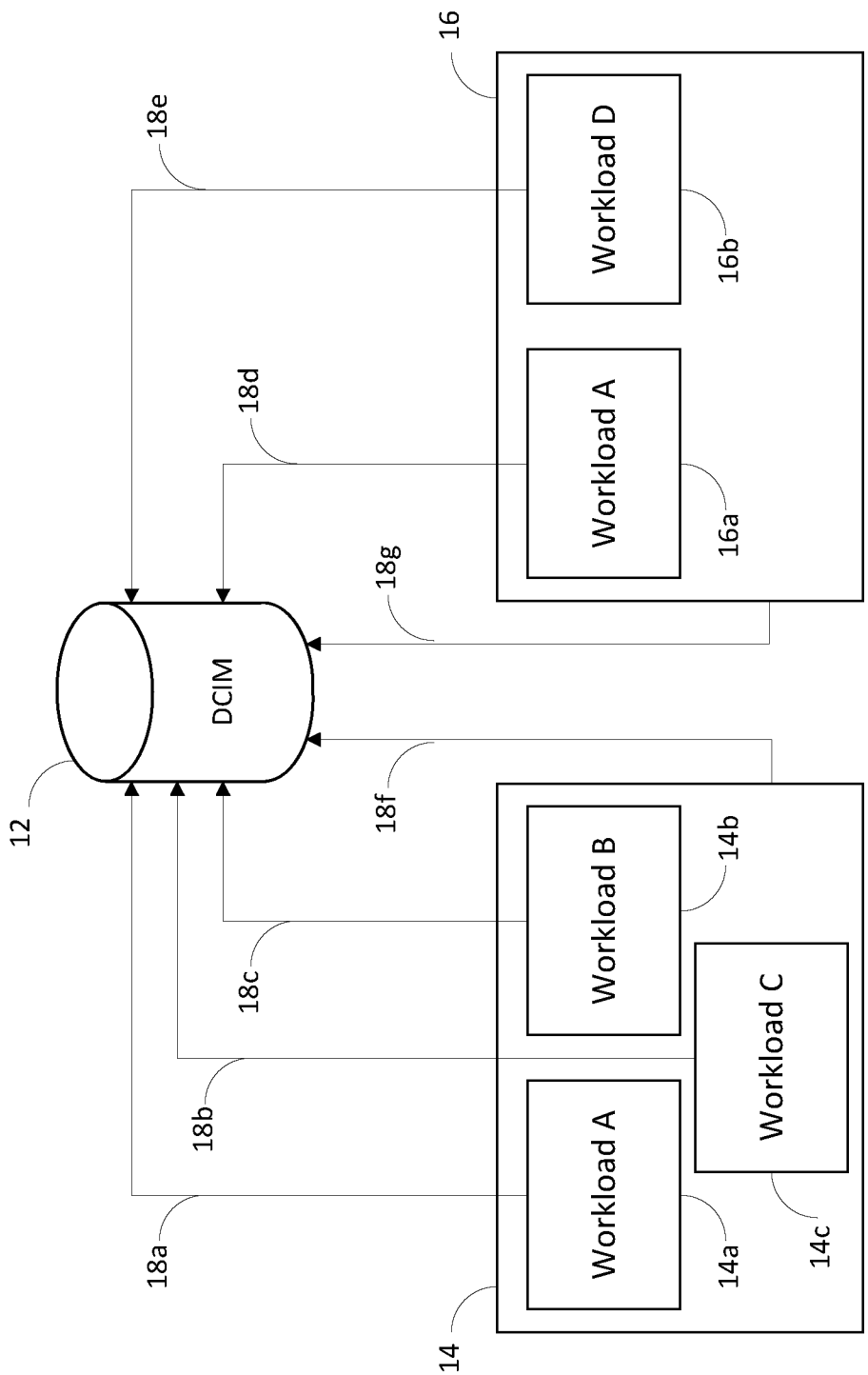
FIG. 1 schematically shows a simplified data center having infrastructure elements that are executing workloads.

FIG. 1 schematically shows a simplified data center 10 in which embodiments of the concepts, techniques, and structures disclosed herein may be used. The data center 10 includes a data center information management (DCIM) database 12 and two infrastructure elements 14, 16. The DCIM database 12 collects and stores telemetry from the infrastructure elements as part of a more general DCIM system, and may be implemented using hardware and software known in the art such as a relational database management system (RDBMS). The infrastructure elements (IEs) 14, 16 also may be implemented using hardware and software known in the art, including and especially computer servers, virtual machines, or execution containers. It is appreciated that a data center may provide any number of infrastructure elements, and thus the depiction in FIG. 1 of only two IEs should not be viewed as limiting.

Each infrastructure element shown in FIG. 1 is executing a number of workloads. As known in the art of distributed computing, a workload itself may be distributed across multiple IEs. Thus, the IE 14 is executing instances 14a, 14b, 14c of three different workloads, namely Workload A, Workload B, and Workload C. Similarly, IE 16 is executing instances of two workloads 16a, 16b, namely Workload A and Workload D. Notice that Workload A is a distributed workload, in the sense that its execution is spread over instances on both IE 14 and IE 16. Notice also that each instance executing on an IE, regardless of the workload to which it is associated, consumes computing resources of that IE. It is appreciated that an infrastructure element, such as IE 14 or IE 16, may concurrently execute any number of workload instances, subject only to the amount of available computing resources in that IE, and thus the depiction in FIG. 1 of three instances executing on IE 14 and two instances executing on IE 16 should not be viewed as limiting.

Monitoring services known in the art can provide real-time visibility into the execution environment condition by monitoring computing resources on the IEs 14 and 16, including consumption of CPU, memory, I/O devices, and storage, and process or instance status. Log aggregation services known in the art provide insights into inbound application requests and the application execution behaviors, including the creation of workloads. These data are sent to the DCIM system where advanced analytics are done, as described below in more detail. In particular, these data may be stored in the DCIM database 12 for later analysis. This allows further insights into how each workload behaves in these execution environments and how they impact the run-time condition of the environment.

Thus, instance 14a of Workload A provides telemetry (e.g. instrumentation data) to the DCIM database 12 via a data connection 18a. Similarly, instances 14c, 14b, 16a, and 16b provide telemetry to the DCIM database 12 via respective data connections 18b-18e. Note that telemetry from Workload A may be stored in aggregate format in the DCIM database 12, since multiple instances of this workload 14a, 16a are concurrently executing on different infrastructure elements 14, 16. This aggregation captures variations in the execution of Workload A across the entire infrastructure, without the burden of managing separate instances of Workload A. In addition to storing the per-workload telemetry, the DCIM database 12 also stores per-IE telemetry data coming from the IEs 14, 16 via respective data connections 18f, 18g. The data connections 18a-18f may be implemented using any data communication technique known in the art.

The distinction between per-workload and per-IE monitoring is well known in the art. For example, Windows® operating systems provide a task manager app (or application) that shows CPU, memory, disk, and network usage (among other computer resources) both in the aggregate for the entire computer, and for each of the executing foreground apps (or applications) and background processes. Similarly, computing resource consumption on infrastructure elements in a data center is monitored both at the per-workload granularity, and at the per-IE granularity.

Embodiments of the concepts, techniques, and structures disclosed herein leverage these telemetry data collected at the workload level and at the IE level across the data center using a two-stage machine learning mechanism. A first model predicts future load of an IE in the data center considering that a new workload will be executed on it. Then a second, ranking model makes informed decisions to rank the candidate IEs and choose the best resource allocation for the workload. These principles are now explained in more detail with reference to FIGS. 2 and 3.

Figure 2:
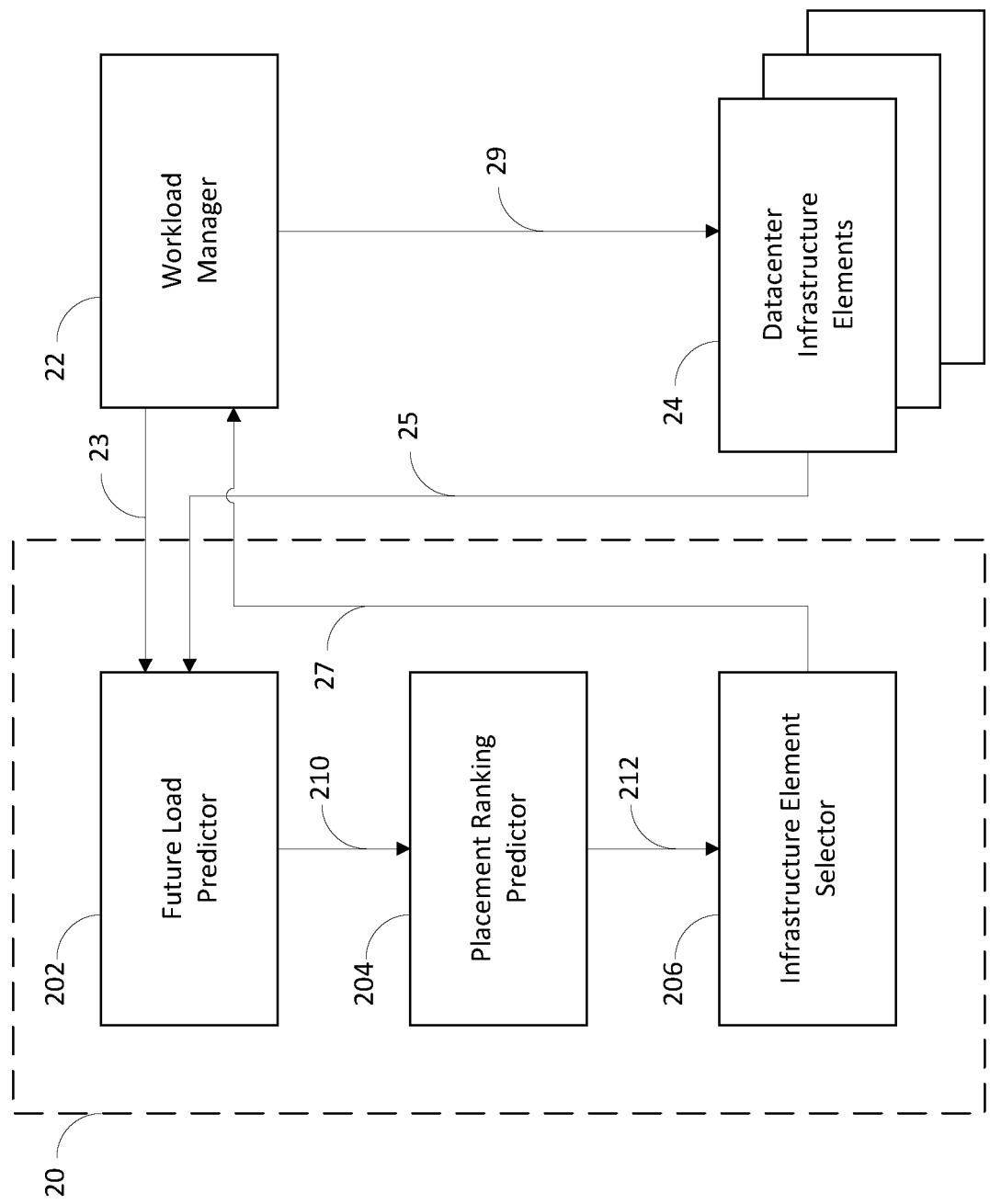
FIG. 2 schematically shows relevant components of a computerized load balancing system for starting execution of a given workload in a data center having a plurality of infrastructure elements, in accordance with an embodiment.

FIG. 2 schematically shows relevant components of a computerized load balancing system 20 for starting execution of a given workload in a data center having a workload manager 22 and a plurality of infrastructure elements 24, in accordance with an embodiment. The load balancing system 20 may form part of the DCIM system discussed above in connection with FIG. 1, and may share some or all of its physical components, including the DCIM database 12. Alternately, the load balancing system 20 may be implemented with separate hardware, or as a combination of hardware and software, such as a computer or system of computers. The workload manager 22 may be any device, machine, or system for managing workloads within the data center, including without limitation creating workloads in response to user requests, starting execution of workloads on one or more infrastructure elements 24, and optionally rebalancing workloads by moving them from one IE to another within the data center. It is appreciated that embodiments disclosed herein are directed to starting execution of workloads initially, not to rebalancing workloads that are already executing in the data center. The IEs 24 may be implemented as described in connection with FIG. 1.

As illustrated in FIG. 2, the load balancing system 20 includes a future load predictor (or "load learner") 202, a placement ranking predictor (or "load optimizer") 204, and an infrastructure element selector 206. The future load predictor 202 has a data receiver that receives, as input at a time t from the workload manager 22, telemetry data 23 associated with an incoming workload and telemetry data 25 from each infrastructure element 24. The future load predictor 202 then outputs a predicted future load 210 for each of a plurality of computing resources, that would occur if the incoming workload were executed using each infrastructure element. In effect, the future load predictor 202 predicts the load of every IE across the entire data center infrastructure, as captured by its output 210.

In embodiments, workload telemetry 23 and IE telemetry 25 are accumulated across time windows of duration w, which may be illustratively five minutes. That is, these data are collected then, when a new workload must be placed in the data center, statistical measures of these data indicate performance of similar workloads in the data center during the time window. Time windows may be measured according to pre-determined periods (e.g. according to a wall clock) or according to rolling periods (e.g. according to the duration w immediately preceding receipt of a new workload). It is appreciated that shorter time windows provide more data points (i.e. statistical measures, such as CPU usage) for subsequent analysis, however these data points are based on less data and thus are potentially less accurate. Conversely, longer time windows provide fewer, but more accurate, statistical measures.

In embodiments, both telemetry and load may be defined in terms of known computing resources, with values normalized to the range between 0 and 1, inclusive. As aforementioned, several data center monitoring tools allows to easily capture such variables. In embodiments, the workload telemetry data 23 may include statistical measures of computing resources such as CPU, memory, and disk usage by other instances of the workload currently executing in the data center. The statistical measures may include, for example, a mean and standard deviation of these resources; explicitly, the telemetry data include a mean CPU usage, a standard deviation of CPU usage, a mean memory usage, a standard deviation of memory usage, a mean disk usage, and a standard deviation of disk usage made by currently-executing instances of the workload to be started. These data are computed based on performance of workloads across the entire data center over the previous time window, as described above, and are thus considered real-time data.

Similarly, the IE telemetry data 25 describe the performance of each IE 24 in the data center. However, in embodiments, the IE telemetry data 25 may be normalized according to the workloads running during the previous time window, to obtain values that are representative of the per-workload amount of computing resources consumed on each IE. That is, the means and standard deviations of the relevant computing resources in each IE are divided by the number of executing workloads in that IE, so that values from different IEs can be meaningfully compared.

Predicted future load 210 for each infrastructure instance also may be represented via normalized measures of CPU, memory, and disk usage. It is appreciated that the predicted future load 210 may be represented by a single number for each such computing resource (e.g. as a triplet of numbers for these three resources), and that embodiments predict such load numbers for each IE 24 in the data center to indicate an expected load on each IE 24 if the workload were to be executed thereon.

In embodiments, the future load predictor 202 includes a first data model that is trained using machine learning, especially supervised machine learning, on the above-mentioned telemetry data, which may be collected from the plurality of infrastructure elements over a plurality of time windows to provide an acceptable training data set. During training, a machine learning algorithm tries to find the function $f$, with optimal parameters $\theta^*$, that relates input telemetry, X, at time t, with system load, Y, at time t+1. In accordance with supervised machine learning, the model is trained with labelled data. It is appreciated that embodiments may be used with a variety of machine learning algorithms known in the art. In accordance with the functions described above, the training data are a collection of samples, each represented by a vector x containing statistical measures of workload telemetry 23 and IE telemetry 25 from each IE 24 where at least one instance of the workload is running. The output data y, corresponding to the input vector x, are the loads of each IE 24 at time t+1. In practice, to collect the training data requires recording the workload telemetry 23 and IE telemetry 25 during a time window that ends at time t and recording the actual loads on each IE 24 at the following time t+1. Doing this trains the model on the future impact of each workload on each IE 24.

At inference time, the trained model is used to obtain predictions of future load 210 for an incoming workload. In other words, given a new input sample $X_{new}$, the future load predictor 202 applies the learned function $f$ to obtain an estimate of the output 210. In practice, the telemetry 23 of all running instances of the workload running at time t is aggregated, and each IE 24 the infrastructure is probed for its live telemetry 25 at the time t. The future load predictor 202 then produces an estimate of the future load 210 of each IE 24 if it were to run the incoming workload in addition to all its other workloads.

In some embodiments, the future load predictor 202 may also use historical, aggregated telemetry from a DCIM database to produce its predicted future load 210. Note that if it is the first time that a given type of workload runs on the infrastructure, no historical information will be available in the DCIM database. In this case, the statistical measures could be replaced by the expected values of the telemetry variables across all workloads stored in the database; that is, across all workloads, not just workloads of the given type. Conversely, if it is the first time a given workload of this type is ever run, the learner will not be able to generate a meaningful predicted load estimate 210, and may indicate this using a separate signal to the placement ranking predictor 204.

The placement ranking predictor 204 receives as input data indicating the future load 210 of each infrastructure element 24 if it were to execute the incoming workload. In embodiments, the placement ranking predictor 204 implements a rank prediction algorithm. Several alternatives exist for this task. Like the future load predictor 202, the placement ranking predictor 204 learns a function that relates its input, the predicted loads 210, to its output 212: rankings of the candidate IEs 24. The learning process also may be supervised, and rely on labelling that assigns a rank to every possible combination of workload telemetry 23, IE telemetry 25, and predicted loads 210 to product a ranking 212 of all of the IEs 24 in order of suitability to execute the given incoming workload.

An infrastructure element selector 206 is further provided to select one or more of the IEs 24 on which to run the incoming workload. While simply predicting a single, best infrastructure element 24 according to some ranking metric should be enough in most cases, predicting a best ranking of all IEs 24 according to rank order 212 allows the IE selector 206 to pick alternative IEs 24 for any reason. The IE selector 206 has a data transmitter for transmitting to the workload manager 22 data indicating the one or more of the IEs on which to execute the workload as data 27. The workload manager 22 then responsively starts execution of the given workload on the indicated one or more infrastructure elements.

Embodiments advantageously provide the data 27 as one or more (i.e. a number k of top-ranked) infrastructure elements. Sometimes, a single, top-ranked IE 24 may not be able to accept a new workload due to business rules, such as a pre-determined maximum number of allowed workloads. In such cases, the business rules may be provided to the workload manager 22 rather than the IE selector 206, for example to simplify the design of the IE selector 206. Thus, the workload manager 22 may assign the workload to the second-best IE in the top-k data 27. Also, by providing the candidates in a rank order 212, the IE selector 206 may determine that the incoming workload should be split among more than one IE 24, and may provide more than one IE 24 to the workload manager 22 as data 27 for this purpose.

Embodiments of the disclosure have several advantages over the prior art. Embodiments predict the future load of an incoming workload on a given infrastructure element of a data center, unlike other techniques that shuffle workloads around or inform the operator how to best increase infrastructure capacity. Moreover, embodiments may make placement decisions via rank prediction using a model trained on a particular data center infrastructure with its own peculiarities, unlike prior art techniques which use combinatorial heuristics that are inflexible and do not account for actual, historical performance.

Figure 3:
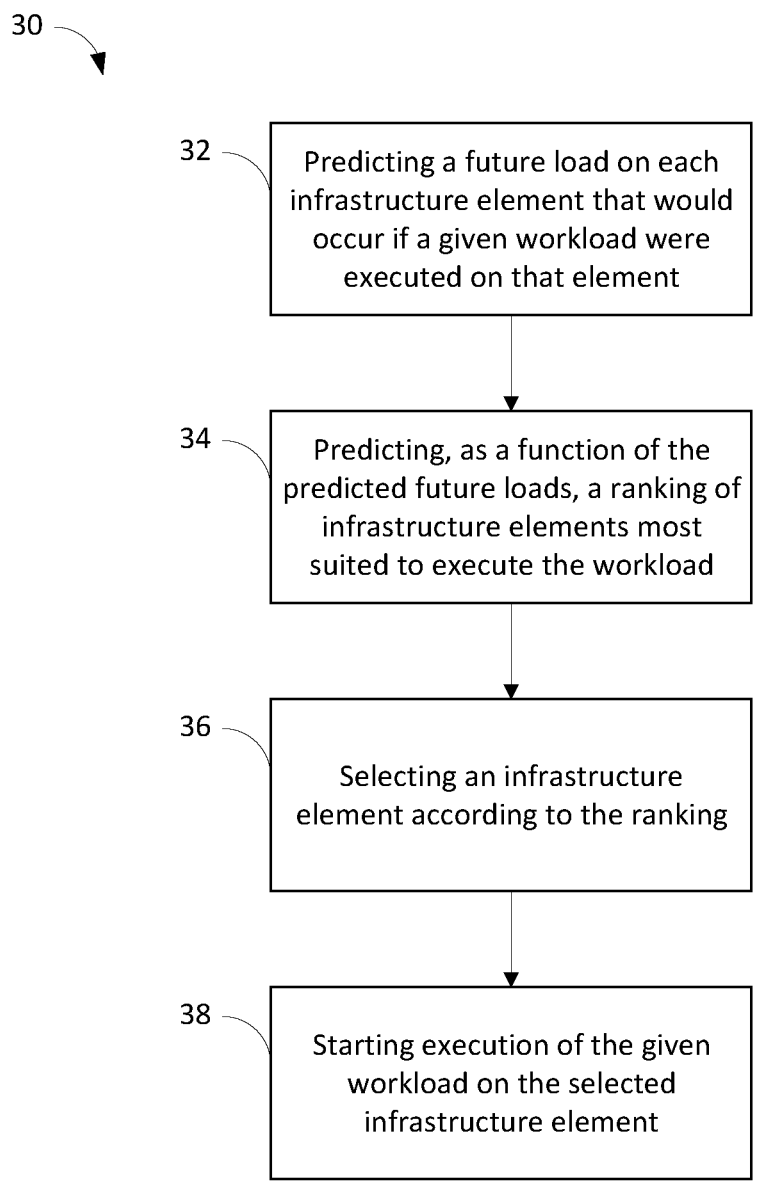
FIG. 3 is a flow diagram for a method of starting execution of a given workload in a data center having a plurality of infrastructure elements, in accordance with an embodiment.

FIG. 3 is a flow diagram for a method 30 of starting execution of a given workload in a data center having a plurality of infrastructure elements, in accordance with an embodiment. The data center may be the data center 10 of FIG. 1, and the method may operate using the load balancing system 20 of FIG. 2 or some other machine or device.

The method 30 begins with a first process 32 of predicting a future load on computing resources in each IE that would occur if a given workload were executed on that IE. The process 32 may be performed by the future load predictor 202 of FIG. 2, or using some other instrumentality. This process 32 is performed for each infrastructure element in the plurality of infrastructure elements, using a first model trained using machine learning, which may be supervised. The computing resources may include any combination of a required CPU time, a required memory space, and a required disk space. As described above, using the first model to perform the inference may include providing inputs comprising statistical measures of computing resources used both by other instances of the given workload currently executing in the data center, and by each infrastructure element in the plurality of infrastructure elements. When no instances of the given workload are currently executing in the data center, the process 32 includes predicting a future load, for each of the plurality of computing resources, that corresponds to a historical average load.

The method 30 continues with a second process 34 predicting, as a function of the future loads predicted by process 32, a ranking of IEs most suited to execute the given, incoming workload. The process 34 may be performed by the placement ranking predictor 204 of FIG. 2, or using some other instrumentality. The process 34 may use a second model trained using machine learning, which may be supervised.

The method 30 continues with a third process 36 selecting one or more infrastructure elements according to the ranking. The process 36 may be performed by the IE selector 206 of FIG. 2, or using some other instrumentality. The process 36 may include selecting the one or more infrastructure elements according to the ranking comprises selecting a highest ranked infrastructure element that satisfies one or more workload acceptance criteria.

The method 30 concludes with a fourth process 38 starting execution of the given workload on the selected one or more infrastructure elements. The process 38 may be performed by the workload manager 22 of FIG. 2 using the IEs 24, or using some other instrumentality. Thus, the overall method 30 concludes with the given, incoming workload starting execution in the data center on the one or more IEs best suited for its execution.

FIG. 4 schematically shows relevant physical components of a computer 40 that may be used to embody the concepts, structures, and techniques disclosed herein. In particular, the computer 40 may be used, in whole or in part, to implement the load balancing system 20 of FIG. 2, or the method 30 of FIG. 3. Generally, the computer 40 has many functional components that communicate data with each other using data buses. The functional components of FIG. 4 are physically arranged based on the speed at which each must operate, and the technology used to communicate data using buses at the necessary speeds to permit such operation.

Thus, the computer 40 is arranged as high-speed components and buses 411 to 416 and low-speed components and buses 421 to 429. The high-speed components and buses 411 to 416 are coupled for data communication using a high-speed bridge 41, also called a "northbridge," while the low-speed components and buses 421 to 429 are coupled using a low-speed bridge 42, also called a "southbridge."

The computer 40 includes a central processing unit ("CPU") 411 coupled to the high-speed bridge 41 via a bus 412. The CPU 411 is electronic circuitry that carries out the instructions of a computer program. As is known in the art, the CPU 411 may be implemented as a microprocessor; that is, as an integrated circuit ("IC"; also called a "chip" or "microchip"). In some embodiments, the CPU 411 may be implemented as a microcontroller for embedded applications, or according to other embodiments known in the art.

The bus 412 may be implemented using any technology known in the art for interconnection of CPUs (or more particularly, of microprocessors). For example, the bus 412 may be implemented using the HyperTransport architecture developed initially by AMD, the Intel QuickPath Interconnect ("QPI"), or a similar technology. In some embodiments, the functions of the high-speed bridge 41 may be implemented in whole or in part by the CPU 411, obviating the need for the bus 412.

The computer 40 includes one or more graphics processing units (GPUs) 413 coupled to the high-speed bridge 41 via a graphics bus 414. Each GPU 413 is designed to process commands from the CPU 411 into image data for display on a display screen (not shown). In some embodiments, the CPU 411 performs graphics processing directly, obviating the need for a separate GPU 413 and graphics bus 414. In other embodiments, a GPU 413 is physically embodied as an integrated circuit separate from the CPU 411 and may be physically detachable from the computer 40 if embodied on an expansion card, such as a video card. The GPU 413 may store image data (or other data, if the GPU 413 is used as an auxiliary computing processor) in a graphics buffer.

The graphics bus 414 may be implemented using any technology known in the art for data communication between a CPU and a GPU. For example, the graphics bus 414 may be implemented using the Peripheral Component Interconnect Express ("PCI Express" or "PCIe") standard, or a similar technology.

The computer 40 includes a primary storage 415 coupled to the high-speed bridge 41 via a memory bus 416. The primary storage 415, which may be called "main memory" or simply "memory" herein, includes computer program instructions, data, or both, for use by the CPU 411. The primary storage 415 may include random-access memory ("RAM"). RAM is "volatile" if its data are lost when power is removed, and "non-volatile" if its data are retained without applied power. Typically, volatile RAM is used when the computer 40 is "awake" and executing a program, and when the computer 40 is temporarily "asleep", while non-volatile RAM ("NVRAM") is used when the computer 40 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 416 may be implemented using any technology known in the art for data communication between a CPU and a primary storage. The memory bus 416 may comprise an address bus for electrically indicating a storage address, and a data bus for transmitting program instructions and data to, and receiving them from, the primary storage 415. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 40 may use up to $8*2^{32}=32$ gigabytes (GB) of primary storage 415. In this example, the memory bus 416 will have a total width of 64+32=96 bits. The computer 40 also may include a memory controller circuit (not shown) that converts electrical signals received from the memory bus 416 to electrical signals expected by physical pins in the primary storage 415, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 411, the graphics processing units 413, the primary storage 415, and the high-speed bridge 41, or any combination thereof, as a single integrated circuit. In such embodiments, buses 412, 414, 416 may form part of the same integrated circuit and need not be physically separate. Other designs for the computer 40 may embody the functions of the CPU 411, graphics processing units 413, and the primary storage 415 in different configurations, obviating the need for one or more of the buses 412, 414, 416.

The depiction of the high-speed bridge 41 coupled to the CPU 411, GPU 413, and primary storage 415 is merely exemplary, as other components may be coupled for communication with the high-speed bridge 41. For example, a network interface controller ("NIC" or "network adapter") may be coupled to the high-speed bridge 41, for transmitting and receiving data using a data channel. The NIC may store data to be transmitted to, and received from, the data channel in a network data buffer.

The high-speed bridge 41 is coupled for data communication with the low-speed bridge 42 using an internal data bus 43. Control circuitry (not shown) may be required for transmitting and receiving data at different speeds. The internal data bus 43 may be implemented using the Intel Direct Media Interface ("DMI") or a similar technology.

The computer 40 includes a secondary storage 421 coupled to the low-speed bridge 42 via a storage bus 422. The secondary storage 421, which may be called "auxiliary memory", "auxiliary storage", or "external memory" herein, stores program instructions and data for access at relatively low speeds and over relatively long durations. Since such durations may include removal of power from the computer 40, the secondary storage 421 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 422 may be implemented using any technology known in the art for data communication between a CPU and a secondary storage and may include a host adaptor (not shown) for adapting electrical signals from the low-speed bridge 42 to a format expected by physical pins on the secondary storage 421, and vice versa. For example, the storage bus 422 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 40 also includes one or more expansion device adapters 423 coupled to the low-speed bridge 42 via a respective one or more expansion buses 424. Each expansion device adapter 423 permits the computer 40 to communicate with expansion devices (not shown) that provide additional functionality. Such additional functionality may be provided on a separate, removable expansion card, for example an additional graphics card, network card, host adaptor, or specialized processing card.

Each expansion bus 424 may be implemented using any technology known in the art for data communication between a CPU and an expansion device adapter. For example, the expansion bus 424 may transmit and receive electrical signals using a Peripheral Component Interconnect ("PCI") standard, a data networking standard such as an Ethernet standard, or a similar technology.

The computer 40 includes a basic input/output system ("BIOS") 425 and a Super I/O circuit 426 coupled to the low-speed bridge 42 via a bus 427. The BIOS 425 is a non-volatile memory used to initialize the hardware of the computer 40 during the power-on process. The Super I/O circuit 426 is an integrated circuit that combines input and output ("I/O") interfaces for low-speed input and output devices 428, such as a serial mouse and a keyboard. In some embodiments, BIOS functionality is incorporated in the Super I/O circuit 426 directly, obviating the need for a separate BIOS 425.

The bus 427 may be implemented using any technology known in the art for data communication between a CPU, a BIOS (if present), and a Super I/O circuit. For example, the bus 427 may be implemented using a Low Pin Count ("LPC") bus, an Industry Standard Architecture ("ISA") bus, or similar technology. The Super I/O circuit 426 is coupled to the I/O devices 428 via one or more buses 429. The buses 429 may be serial buses, parallel buses, other buses known in the art, or a combination of these, depending on the type of I/O devices 428 coupled to the computer 40.

The techniques and structures described herein may be implemented in any of a variety of different forms. For example, features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A computerized system for starting execution of a given workload in a data center having a plurality of infrastructure elements, the computerized system comprising:
    a data receiver for receiving, from a workload manager, data indicating the given workload;
    a future load predictor, for each infrastructure element in the plurality of infrastructure elements, using a first model trained using machine learning to predict a load, during a future time window for each of a plurality of computing resources, that would occur if the given workload were executed using that infrastructure element;
    a placement ranking predictor, using a second model trained using machine learning to predict, as a function of the predicted future loads, a ranking of infrastructure elements that would be most suited to execute the given workload;
    an infrastructure element selector for selecting one or more infrastructure elements according to the ranking; and
    a data transmitter for transmitting, to the workload manager, data indicating the selected one or more infrastructure elements;
    wherein the workload manager responsively starts execution of the given workload on the indicated one or more infrastructure elements.

2. The system of claim 1, wherein either or both of the first model and the second model were trained, using supervised machine learning, on telemetry data collected from the plurality of infrastructure elements over a plurality of time windows.

3. The system of claim 1, wherein the computing resources include any combination of a required CPU time, a required memory space, and a required disk space.

4. The system of claim 1, wherein using the first model comprises providing, to the first model, inputs comprising statistical measures of computing resources used during a current time window by (a) other instances of the given workload currently executing in the data center, and (b) each infrastructure element in the plurality of infrastructure elements.

5. The system of claim 1, wherein using the first model comprises, when no instances of the given workload are currently executing in the data center, predicting a future load for each of the plurality of computing resources that corresponds to a historical average load.

6. The system of claim 1, wherein selecting the one or more infrastructure elements according to the ranking comprises selecting a highest ranked infrastructure element that satisfies one or more workload acceptance criteria.

7. A method of starting execution of a given workload in a data center having a plurality of infrastructure elements, the method comprising:
    for each infrastructure element in the plurality of infrastructure elements, using a first model trained using machine learning to predict a load, during a future time window for each of a plurality of computing resources, that would occur if the given workload were executed using that infrastructure element;
    using a second model trained using machine learning to predict, as a function of the predicted future loads, a ranking of infrastructure elements that would be most suited to execute the given workload;
    selecting one or more infrastructure elements according to the ranking; and
    starting execution of the given workload on the selected one or more infrastructure elements.

8. The method of claim 7, wherein either or both of the first model and the second model were trained, using supervised machine learning, on telemetry data collected from the plurality of infrastructure elements over a plurality of time windows.

9. The method of claim 7, wherein the computing resources include any combination of a required CPU time, a required memory space, and a required disk space.

10. The method of claim 7, wherein using the first model comprises providing, to the first model, inputs comprising statistical measures of computing resources used during a current time window by (a) other instances of the given workload currently executing in the data center, and (b) each infrastructure element in the plurality of infrastructure elements.

11. The method of claim 7, wherein using the first model comprises, when no instances of the given workload are currently executing in the data center, predicting a future load for each of the plurality of computing resources that corresponds to a historical average load.

12. The method of claim 7, wherein selecting the one or more infrastructure elements according to the ranking comprises selecting a highest ranked infrastructure element that satisfies one or more workload acceptance criteria.

13. The method of claim 7, wherein starting execution of the given workload comprises starting a new service on a computer server, or starting a new process in an existing virtual machine, or starting execution of a containerized process.

14. A non-transitory, computer-readable storage medium, in which is stored computer program code for performing a method of starting execution of a given workload in a data center having a plurality of infrastructure elements, the method comprising:

for each infrastructure element in the plurality of infrastructure elements, using a first model trained using machine learning to predict a load, during a future time window for each of a plurality of computing resources, that would occur if the given workload were executed using that infrastructure element;

using a second model trained using machine learning to predict, as a function of the predicted future loads, a ranking of infrastructure elements that would be most suited to execute the given workload;

selecting one or more infrastructure elements according to the ranking; and starting execution of the given workload on the selected one or more infrastructure elements.

15. The storage medium of claim 14, further comprising computer program code for training either or both of the first model and the second model using supervised machine learning on telemetry data collected from the plurality of infrastructure elements over a plurality of time windows.

16. The storage medium of claim 14, wherein the computing resources include any combination of a required CPU time, a required memory space, and a required disk space.

17. The storage medium of claim 14, wherein the computer program code for using the first model comprises computer program code for providing, to the first model, inputs comprising statistical measures of computing resources used during a current time window by (a) other instances of the given workload currently executing in the data center, and (b) each infrastructure element in the plurality of infrastructure elements.

18. The storage medium of claim 14, wherein the computer program code for using the first model comprises computer program code for, when no instances of the given workload are currently executing in the data center, predicting a future load for each of the plurality of computing resources that corresponds to a historical average load.

19. The storage medium of claim 14, wherein the computer program code for selecting the one or more infrastructure elements according to the ranking comprises computer program code for selecting a highest ranked infrastructure element that satisfies one or more workload acceptance criteria.

20. The storage medium of claim 14, wherein the computer program code for starting execution of the given workload comprises computer program code for starting a new service on a computer server, or starting a new process in an existing virtual machine, or starting execution of a containerized process.

* * * * *